May 29, 1962 H. M. GEYER 3,036,472
MULTIPLE ACTUATOR ASSEMBLY
Filed March 4, 1959 2 Sheets-Sheet 1

INVENTOR.
Howard M. Geyer
BY
*W. E. Finken*
His Attorney

… …

United States Patent Office 3,036,472
Patented May 29, 1962

3,036,472
MULTIPLE ACTUATOR ASSEMBLY
Howard M. Geyer, Dayton, Ohio, assignor to General Motors Corporation, Detroit, Mich., a corporation of Delaware
Filed Mar. 4, 1959, Ser. No. 797,293
17 Claims. (Cl. 74—89)

This invention pertains to rotary actuators, and particularly to a multiple rotary actuator assembly designed for operating a device subjected to progressively varying loads throughout its length.

In the field of aeronautics, numerous pivotally movable control devices are subjected to progressively varying loads by virtue of the fact that the control surfaces are of tapered configuration from the root to the tip ends. For example, the tail fin of a missile may comprise an airfoil surface which tapers from its root to its tip end. This invention relates to a combined structural support and actuator assembly for an aeronautical device control surface which tapers from its root to its tip end, the actuator assembly embodying the principles set forth in my copending application Serial No. 794,280, filed February 19, 1959, now United States Patent No. 2,945,387. Accordingly, among my objects are the provision of a multiple rotary actuator assembly comprising a plurality of interconnected rotary actuators of different diameters; the further provision of a structural support for an aeronautical device control surface of progressively decreasing width from its root to tip end including rotary actuator means for imparting pivotal movement to the control surface; the still further provision of a multiple rotary actuator assembly of the fluid pressure operated type including means for mechanically synchronizing the operation thereof and means for connecting the several actuators in a parallel fluid circuit arrangement; and the still further provision of an improved rotary actuator assembly.

The aforementioned and other objects are accomplished in the present invention by utilizing a tapered spar as a structural support for the aeronautical device control surface and incorporating rotary actuators of different diameters along the length of the spar. Specifically, the spar which supports the control surface comprises a hollow tubular member having sections of decreasing diameter from its root to its tip end. In the disclosed embodiment, four rotary actuators of progressively decreasing diameter are assembled with the spar from its root to its tip end.

Each rotary actuator comprises a rotary cylinder suitably connected to the control surface which extends the length of the spar. Each cylinder contains a two-part reciprocable piston which divides the cylinder into opposed actuator chambers. The opposed actuator chambers can be alternately connected to pressure and drain so as to impart reciprocation to the piston. Each piston section is formed with relatively short internal helical spline teeth, one section of which mates with an externally splined output sleeve rigidly connected with the cylinder so as to rotate therewith. The other helical splined piston section mates with an external helically splined reaction sleeve which is keyed to the stationary spar. Accordingly, the cylinder comprises the rotary output member of the actuator, the several cylinders being subjected to progressively varying loads due to the configuration of the fin connected thereto.

The inboard chambers of all of the rotary actuators are interconnected by external tubing, and the outboard chambers of the actuators are likewise interconnected by external tubing so that the actuators are connected in a parallel fluid circuit arrangement. The opposed inboard actuators are connected through passages in the stationary spar to a pair of channels formed between the inner surface of the spar and a tube disposed therein. These channels connect with extend and retract ports formed in the root portion of the spar.

The reaction sleeve is restrained against axial movement relative to the spar by a single piece snap ring which supports the thrust loads in both directions.

Further objects and advantages of the present invention will be apparent from the following description, reference being had to the accompanying drawings, wherein a preferred embodiment of the present invention is clearly shown.

Figure 1:
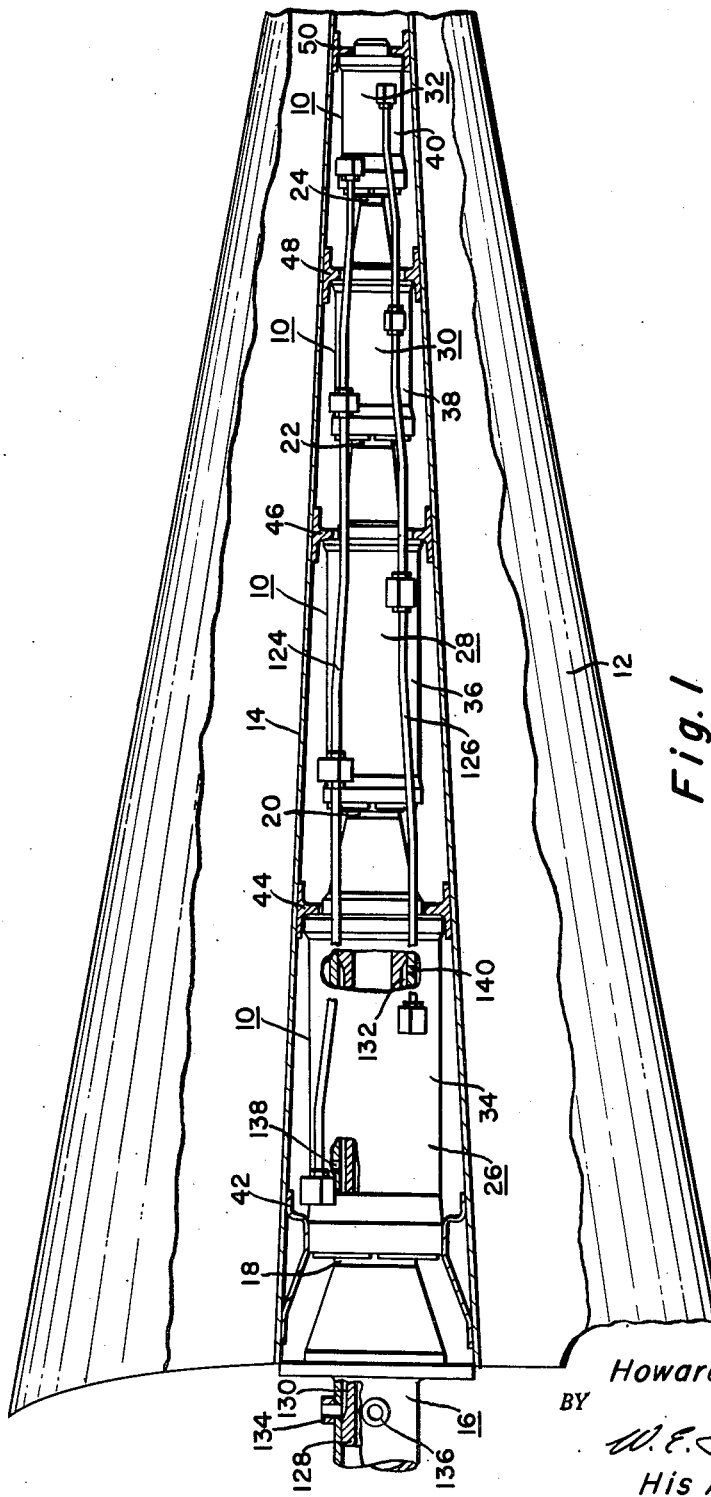
FIGURE 1 is a fragmentary view, partly in section and partly in elevation, depicting a pivotally movable control surface and multiple actuator assembly therefor.

With particular reference to FIGURE 1, a multiple rotary actuator assembly generally indicated by the numeral 10 is shown in combination with a control surface, such as a tapered tail fin 12 of a missile. The fin 12 is subjected to decreasing leads from its root end to its tip end by virtue of its decreasing chord width. The fin 12 includes a centrally located tubular member 14 of gradually decreasing cross-sectional area from its root end to its tip. A stationary hollow supporting spar 16 having sections 18, 20, 22 and 24 of progressively decreasing diameter is disposed within the tubular member 14 and constitutes the supporting member for the tail fin 12.

The multiple rotary actuator assembly 10 includes four rotary actuators 26, 28, 30 and 32, these actuators being of identical construction except for their lengths, diameters, piston strokes and helix angles. Thus, the successive actuators 26, 28, 30 and 32 are of decreasing length and decreasing diameter, and have shorter piston strokes and different helix angles from the root to the tip of the spar 16 in accordance with the load distribution of the control surface to be operated, namely the tail fin 12. The several actuators include cylinders 34, 36, 38 and 40, respectively which are supported for rotation relative to the spar 16 to be described, and the several actuator cylinders are drivingly connected with the tubular member 14 and the fin 12. All of the actuator cylinders rotate throughout the same angular distance for a complete stroke of their respective pistons. The interconnection between the actuator cylinders mechanically synchronizes the movement of the cylinders so as to impart pivotal movement to the fin 12 upon movement thereof. The cylinder 34 is flange connected at 42 and 44 with the tubular member 14, and the cylinders 36, 38 and 40 are flange connected at 46, 48 and 50, respectively with the tubular member 14.

Figure 2:
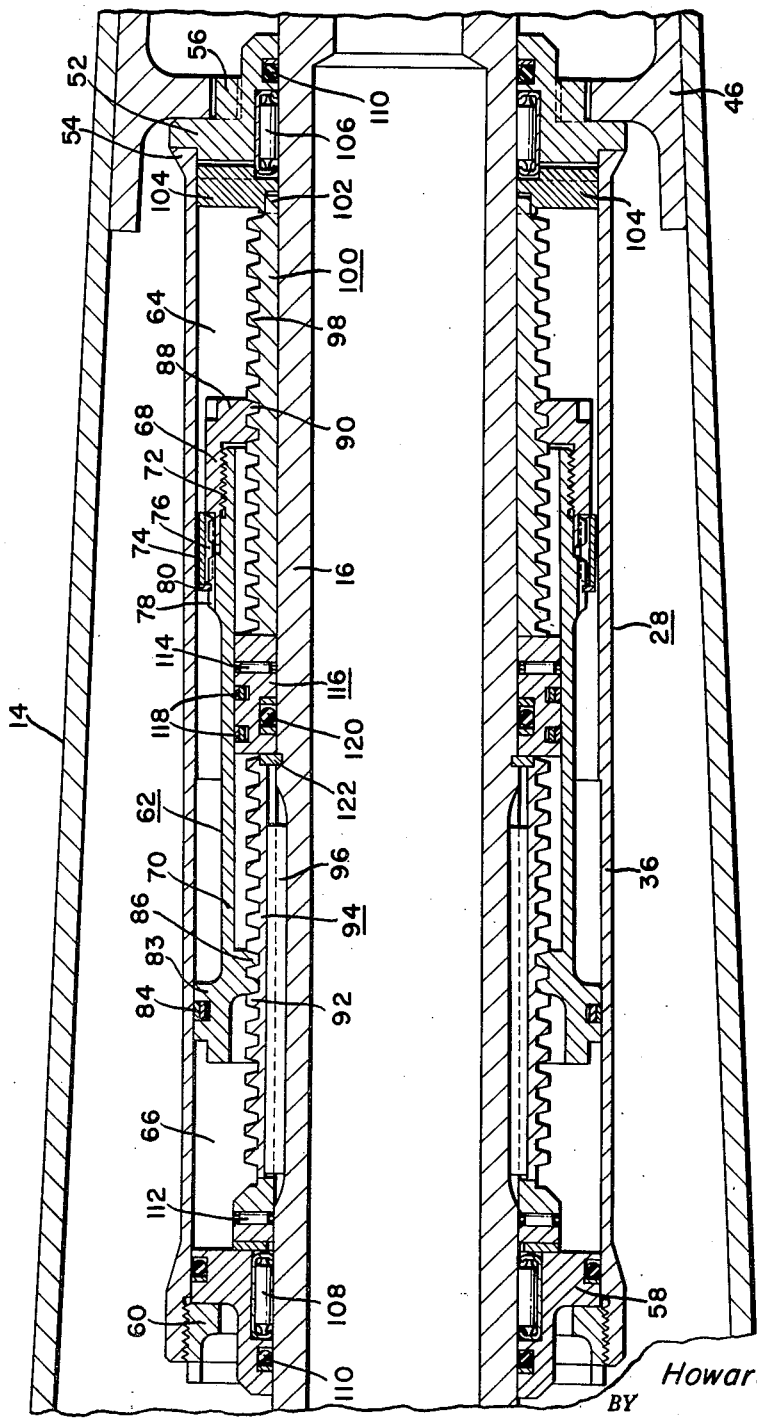
FIGURE 2 is an enlarged fragmentary sectional view of a rotary actuator constructed according to this invention and embodied in the multiple actuator assembly of FIGURE 1.

With reference to FIGURE 2, the construction of the actuators will be described. The actuator depicted in FIGURE 2 corresponds to actuator 28 in FIGURE 1, and thus includes a cylinder 36 which is flange connected at 46 to the tubular member 14. The other end of the cylinder 36 is closed by a head cap which may be welded to the cylinder as indicated by numeral 54. The end cap 52 is keyed to the flanged member 46 as indicated by numeral 56 whereby any rotation of the cylinder 36 will be imparted to the flange member 46 and the tubular member 14. The inner end of the cylinder 36 is closed by a tail cap 58 which is held in assembled relation with the cylinder 36 by a nut 60.

The cylinder 36 contains a reciprocable piston assembly 62 which divides the cylinder 36 into opposed chambers 64 and 66. The piston assembly 62 comprises a pair of sleeves 68 and 70 which are threadedly interconnected at 72 and retained in assembled relation by a straight spline locking ring 74 which engages straight spline teeth 76 on the sleeve 68 and 78 on the sleeve 70. The locking ring 74 is retained in assembled relation with the sleeve by a snap ring 80. The sleeve 70 includes a head portion 83 having piston rings 84 for sealingly engaging the inner wall of the cylinder 36. The inner periphery of the head portion is formed with helical spline teeth 86. The sleeve 68 is formed with a flange portion 88 having internal helical spline teeth 90.

The helical spline teeth 86 mate with a complementary set of external helical spline teeth 92 formed on a sleeve member 94. The sleeve member 94 is connected to the spar 16 by a plurality of keys such as indicated by numeral 96. The sleeve member 94 constitutes a stationary reaction member of the rotary actuator such that upon reciprocation of the piston assembly 62, angular movement will be imparted to the piston assembly. The helical spline teeth 90 mate with a complementary set of external helical spline teeth 98 formed on a sleeve 100. The sleeve 100 is rotatably supported on the spar 16 and is keyed at 102 to a ring 104. The ring 104 is in turn keyed to the head cap 52.

The head cap 52 and the tail cap 58 are supported for rotation relative to the spar 16 by bearing assemblies 106 and 108. Each of the end caps carries an O-ring seal 110 which engages the outer periphery of the spar 16. The end cap 58 is supported for rotation relative to the reaction sleeve 94 by a needle bearing assembly 112. The output sleeve 100 is supported for rotation relative to the reaction sleeve 94 by a needle bearing assembly 114. The inner race 116 of the needle bearing assembly 114 comprises an internally and externally grooved ring having a piston ring seal 118 which engage the inner surface of the sleeve 70 and an O-ring seal 120 which engages the tubular spar 16. A snap ring 122 is disposed within an external groove in the spar 16 and engages both the inner race 116 of the needle bearing 114 and the reaction sleeve 94. The snap ring 122 supports the axial thrust loads imposed on the reaction member 94 during piston reciprocation.

Since the reaction sleeve 94 is restrained against all movement, reciprocation of the piston assembly 62 is accomplished by a slight angular movement thereof due to the interaction of helical spline teeth 92 and 86. This angular movement of the piston assembly 62 will be imparted to the rotary sleeve 100, and through the interaction of helical spline teeth 90 and 98, the sleeve 100 will be angularly moved throughout a distance equal to the sum of the rotation caused by the spline teeth 96 and 86 and 90 and 98. The rotary movement imparted to the sleeve 100 is in turn imparted to the cylinder 36 and to the hub 14 of the tail fin 12.

Reciprocation of the piston assembly 62 is effected by subjecting the opposed chambers 64 and 66 to a pressure differential. Thus, if the chamber 64 is subjected to pressure and the chamber 66 is connected to drain, the piston assembly 62 will move to the left as viewed in FIGURE 1 whereby imparting angular movement to the cylinder 36 and the tubular member 14 in one direction. Conversely, if the chamber 66 is subjected to pressure and chamber 64 is connected to drain, the piston assembly 62 will move to the right as viewed in FIGURE 2 thereby imparting angular movement to the cylinder 36 in the opposite direction. The extent of angular movement of the output sleeve 100 during the stroke of the piston assembly 62 is determined by the character of helical spline teeth on the sleeves 94 and 100. In the instant multiple actuator assembly the total angular movement of each actuator cylinder is the same, although the torque output of the actuators varies. To achieve this result the diameter of the actuator cylinders progressively decreases, the length of the piston strokes decreases, and the helix angle of the spline teeth varies progressively.

The cylinder diameter will be designed by the inside envelope of the controlling structure. This in most airborne devices is tapered from attachment to tip. Thus, with envelope fixed, each succeeding actuator has a smaller diameter and is shorter with the helix angle varied to give them all the same angular output.

Referring again to FIGURE 1, the several actuator cylinders are hydraulically interconnected in parallel by conduits 124 and 126. The conduit 124 communicates with the inboard chamber of the inboard actuator 26, and the conduit 126 communicates with the outboard chamber of the actuator 26. The chambers of the actuator 26 can be supplied with fluid under pressure or connected to drain through the stationary spar 16. To accomplish this result, a tube 128 having four milled grooves circumferentially spaced 90° apart and terminating short of the ends of the tube 128 is located within the root section of the hollow spar 16. The tube 128 is connected to the spar 16 by brazing, and adjacent pairs of milled grooves in the tube 128 are suitably interconnected by arcuate grooves, not shown so as to form two passages for the flow of fluid to and from the opposed chambers of actuator 26. Two of the diametrically opposed grooves are shown in FIGURE 1, these grooves being depicted by numerals 130 and 132. Since the spar 16 is stationary, conduits for hydraulic fluid can be attached to the spar, and for this purpose the spar has fittings 134 and 136 attached thereto. Hydraulic fluid supplies to or drained from the fitting 134 is supplied to or drained from the groove 130 and the groove 130 connects with the inboard chamber of the actuator 26 through passage means 138 in the spar 16. The groove 132 communicates with the outboard chamber of the actuator 26 through passage means 140 in the spar 16. Since the conduits 124 and 126 connect the inboard and outboard chambers of the several actuators in a fluid parallel circuit arrangement, when it is desired to adjust the tail fin 12 in one direction fluid under pressure is supplied to the fitting 134 while the fitting 136 is connected to drain whereupon all of the inboard chambers of the several actuators will be subjected to fluid under pressure. Moreover, by virtue of the cylinders being rigidly interconnected by the tubular member 14, the movements of the several actuators will be mechanically synchronized. The load imposed on each actuator is proportional to the area of the surface of the tail fin 12 with which it is directly connected, and this load variation determines the relative size of the actuators and the helix angles of the spline teeth thereof.

While the embodiment of the invention as herein disclosed constitutes a preferred form, it is to be understood that other forms might be adopted.

What is claimed is as follows:

1. A multiple rotary actuator assembly including, a stationary support member, a plurality of tandem arranged actuators located in spaced relation along the length of said member, each actuator comprising a cylinder having a reciprocable piston disposed therein capable of fluid pressure actuation in either direction and helical means interconnecting said piston with each of said member and said cylinder for imparting rotation to said cylinder upon reciprocation of said piston, said stationary support member extending longitudinally through the cylinders of said plurality of actuators, means supporting each of said cylinders for rotation relative to said member, and means interconnecting the cylinders of said plurality of actuators to mechanically synchronize the movements thereof.

2. A multiple rotary actuator assembly including, a stationary support member, a plurality of tandem arranged actuators located in spaced relation along the length of said member, each actuator comprising a cylinder having a reciprocable piston therein capable of fluid pressure actuation in either direction, said piston dividing said cylinder into opposed chambers and helical means interconnecting said piston with each of said member and said cylinder for imparting rotation to the cylinder upon reciprocation of said piston, said stationary support member extending longitudinally through the cylinders of said plurality of actuators, means supporting each of said cylinders for rotation relative to said member, means interconnecting the cylinders of said plurality of actuators to mechanically synchronize the movements thereof, and means interconnecting the opposed chambers of said plurality of actuators in a parallel fluid circuit arrangement.

3. A multiple rotary actuator assembly including, a stationary support member, a plurality of tandem arranged actuators located in spaced relation along the length of said member, each actuator comprising a cylinder having a reciprocable piston disposed therein capable of fluid pressure actuation in either direction and a helical spline connection between said piston and each of said support member and said cylinder for imparting rotation to said cylinder upon reciprocation of said piston, said actuators being of progressively varying size and having progressively varying helix angles from one end to the other of said stationary support member whereby the total angular movement of each cylinder is the same while the torque output of the actuators varies in accordance with the size thereof, said stationary support member extending longitudinally through the cylinders of said plurality of actuators, means supporting each of said cylinders for rotation relative to said member, and means interconnecting the cylinders of said plurality of actuators to mechanically synchronize the movements thereof.

4. A multiple rotary actuator assembly including, a stationary support member, a plurality of tandem arranged actuators located in spaced relation along the length of said member, each actuator comprising a cylinder having a reciprocable piston disposed therein capable of fluid pressure actuation in either direction and a helical spline connection between said piston and each of said member and said cylinder for imparting rotation to said cylinder upon reciprocation of said piston, said actuators being of progressively decreasing size and having progressively increasing helix angles from one end to the other of said stationary support member whereby the total angular movement of each cylinder is the same while the torque output of the actuator varies in accordance with the size thereof, said stationary support member extending longitudinally through the cylinders of said plurality of actuators, means supporting each of said cylinders for rotation relative to said member, means interconnecting the cylinders of said plurality of actuators to mechanically synchronize the movements thereof, each piston dividing its respective cylinder into a pair of opposed chambers, and conduit means interconnecting the opposed chambers of the several actuators in a parallel fluid circuit arrangement.

5. A multiple rotary actuator assembly including, a stationary support member, a plurality of tandem arranged actuators located in spaced relation along the length of said member, each actuator comprising a cylinder having a reciprocable piston disposed therein capable of fluid pressure actuation in both directions, a reaction sleeve rigidly connected to said stationary support member, an output sleeve supported for rotation relative to said support member, helical spline connections between said piston and said sleeves whereby reciprocation of the piston will effect rotation of said output sleeve and means interconnecting the output sleeve with its respective cylinder, said stationary support member extending longitudinally through the cylinders of said plurality of actuators, means supporting each of said cylinders for rotation relative to said member, and means interconnecting the cylinders of said plurality of actuators to mechanically synchronize the movements thereof.

6. The multiple rotary actuator assembly set forth in claim 5 wherein said actuators are of progressively decreasing size from one end of said support member to the other end thereof, and wherein the helix angle of the spline connections between said piston and said sleeves progressively increases from one end of said member to the other end thereof whereby the total angular movement of each output sleeve is the same.

7. The multiple actuator assembly set forth in claim 5 wherein each piston divides its respective cylinder into a pair of opposed chambers, and means interconnecting the opposed chambers of the several actuators in a parallel fluid circuit arrangement.

8. A multiple rotary actuator assembly including, a stationary support member, a plurality of tandem arranged actuators located in spaced relation along the length of said member, each actuator comprising a cylinder having a reciprocable piston assembly disposed therein capable of fluid pressure actuation in both directions, a reaction sleeve disposed within said cylinder and rigidly connected to said stationary support member, an output sleeve disposed within said cylinder and supported for rotation relative to said stationary support member, said sleeves having external helical spline teeth, said piston assembly having spaced sets of internal helical spline teeth mating with the external helical spline teeth of said sleeves whereby reciprocation of said piston assembly imparts rotation to said output sleeve and means interconnecting the output sleeve with its respective cylinder, said stationary support member extending longitudinally through the cylinders of said plurality of actuators, means supporting each of said cylinders for rotation relative to said member, and means interconnecting the cylinders of said plurality of actuators to mechanically synchronize the movements thereof.

9. The multiple rotary actuator assembly set forth in claim 8 wherein said actuators are of progressively decreasing size from one end to the other of said stationary support member, and wherein the helix angle of the spline teeth in said actuators progressively increases from said one end to the other end of said stationary support member whereby the torque output of said several actuators decreases from one end to the other end of said stationary support member while the total angular movement thereof is the same.

10. In combination, a stationary member having sections of progressively decreasing diameter from its root to its tip end, a plurality of tandem arranged rotary actuators located in spaced relation along the length of said member, each actuator comprising a cylinder having a reciprocable piston disposed therein capable of fluid pressure actuation in either direction and helical spline connection means between said piston and each of said stationary member and said cylinder for imparting rotation to said cylinder upon reciprocation of said piston, said stationary support member extending longitudinally through the cylinders of said plurality of actuators, means suporting each of said cylinders for rotation relative to said member, a tubular member inclosing said stationary support member and said tandem arranged actuators, means interconnecting the cylinders of said several actuators with said tubular member to mechanically synchronize the movements thereof, and a control surface attached to said tubular member.

11. The combination set forth in claim 10 wherein said control surface has a progressively decreasing chord width from the root to the tip end thereof whereby the load imposed upon said control surface progressively decreases from the root to the tip end thereof, and wherein the size of the several actuators progressively decreases from the root to the tip end of said support member while the helix angle of the spline connection means in the several actuators progressively increases from the root to the tip end of said support member whereby the torque output of each actuator progressively decreases from the root to the tip end of said support member while the total angular movement of each atcuator remains the same.

12. A rotary actuator including, a stationary support member, a cylinder surrounding said stationary support member, a reciprocable piston assembly disposed within said cylinder capable of fluid pressure actuation in both directions, a reaction sleeve disposed within said cylinder and keyed to said stationary support member so as to be restrained against rotation relative thereto, snap ring means engaging said reaction sleeve and said stationary support member to prevent axial movement of said reaction sleeve, a rotary output sleeve disposed within said cylinder and supported for rotation relative to said stationary support member, said sleeves being spaced apart and coaxially arranged and having external helical spline teeth, said piston assembly having spaced sets of internal helical spline teeth engaging said sleeves whereby reciprocation of said piston asembly imparts rotation to said output sleeve.

13. The actuator set forth in claim 12 including means supporting said cylinder for rotation relative to said stationary support member, and means interconnecting said cylinder and said output sleeve.

14. A multiple rotary actuator assembly including, a stationary support member, a plurality of tandem arranged actuators located in spaced relation along the length of said member, each actuator comprising a cylinder having a reciprocable piston assembly disposed therein capable of fluid pressure actuation in both directions, a reaction sleeve disposed within said cylinder and keyed to said stationary support member, a snap ring engaging said reaction sleeve and said stationary support member for precluding axial movement of said reaction sleeve relative to said stationary support member and supporting the thrust loads in both directions during reciprocation of said piston assembly, an output sleeve disposed within said cylinder and supported for rotation relative to said stationary support member, said sleeves having external helical spline teeth, said piston assembly having spaced sets of internal helical spline teeth mating with the external helical spline teeth of said sleeves whereby reciprocation of said piston assembly imparts rotation to said output sleeve and means interconnecting the output sleeve with its respective cylinder, means supporting said cylinders for rotation relative to said stationary support member, and means interconnecting the cylinders of said plurality of actuators to mechanically synchronize the movements thereof.

15. A multiple rotary actuator assembly including, a stationary hollow support member, a plurality of tandem arranged actuators located in spaced relation along the length of said member, each actuator comprising a cylinder having a reciprocable piston assembly disposed therein capable of fluid pressure actuation in both directions, a reaction sleeve disposed within said cylinder and rigidly connected to said stationary support member, an output sleeve disposed within said cylinder and supported for rotation relative to said stationary support member, said sleeves having external helical spline teeth, said piston assembly having spaced sets of internal helical spline teeth mating with the external helical spline teeth of said sleeves whereby reciprocation of said piston assembly imparts rotation to said output sleeve and means interconnecting the output sleeve with its respective cylinder, means supporting said cylinders for rotation relative to said member, a tube disposed within and attached to a portion of said hollow support member, said tube having a pair of external grooves, each piston assembly dividing its respective cylinder into a pair of opposed chambers, passage means in said hollow support member connecting one chamber of one actuator with one of said grooves and the other chamber of said one actuator with the other of said grooves, conduit means interconnecting the opposed chambers of the other actuators with the opposed chambers of said one actuator so that said plurality of actautors are connected in parallel fluid circuit arrangement, and means interconnecting the cylinders of said plurality of actuators to mechanically synchronize the movements thereof.

16. A rotary actuator assembly including, a stationary support member, a cylinder rotatably journalled on said support member, reciprocable piston means disposed within said cylinder, a pair of members disposed within said cylinder having external helical means, means connecting one of said members with said stationary support so as to prevent movement thereof, means supporting the other member for rotation relative to said stationary support, said piston means having internal helical means mating with the external helical means of said members whereby reciprocation of said piston means imparts rotation to said other member, and means connecting the other member and said cylinder.

17. A rotary actuator assembly including, a stationary support member, a cylinder journalled for rotation relative to said support member, reciprocable piston means disposed within said cylinder, a pair of members disposed within said cylinder having external helical means, one of said members being keyed to said stationary support member, a snap ring engaging said one member and said stationary support member for restraining axial movement of said one member relative to said stationary support member and supporting the thrust loads in both directions, means supporting the other member for rotation relative to said stationary support member, said piston means having internal helical means mating with the external helical means on said members whereby reciprocation of said piston means imparts rotation to said other member, and means connecting said other member and said cylinder.

References Cited in the file of this patent
UNITED STATES PATENTS

| | | |
|---|---|---|
| 2,743,618 | Watson et al. | May 1, 1956 |
| 2,791,128 | Geyer et al. | May 7, 1957 |